United States Patent

Mueller

[15] 3,641,914
[45] Feb. 15, 1972

[54] WIND DEFLECTOR FOR CHIMNEYS AND THE LIKE

[72] Inventor: Everett C. Mueller, Fredericksburg, Iowa 50630

[22] Filed: June 1, 1970

[21] Appl. No.: 41,913

[52] U.S. Cl. ..................................................98/66
[51] Int. Cl. ..............................................F23l 17/02
[58] Field of Search ..................98/58–60, 61, 66, 98/67

[56] References Cited

UNITED STATES PATENTS

| 660,143 | 10/1900 | Blanchette | 98/66 X |
| 1,489,886 | 4/1924 | Hart et al. | 98/66 |
| 3,314,355 | 4/1967 | Bassett | 98/66 |

Primary Examiner—Edward J. Michael
Attorney—Zarley, McKee & Thomte

[57] ABSTRACT

A wind deflector for chimneys and the like comprising a first open-mesh cylindrical wire element having a second open-mesh cylindrical wire element concentrically positioned in a spaced condition within the first wire element. A plurality of perforated arcuate baffle elements extend between the first and second wire elements and have their opposite ends secured thereto. The baffle elements are substantially symmetrically spaced in the space between the first and second wire elements. The deflector is positioned around the chimney or the like and is secured thereto by wires or the like. A cover extends over the upper ends of the wire elements and is secured thereto.

8 Claims, 5 Drawing Figures

PATENTED FEB 15 1972

3,641,914

INVENTOR
EVERETT C. MUELLER
BY
Zarley, McKee & Thomte
ATTORNEYS

WIND DEFLECTOR FOR CHIMNEYS AND THE LIKE

In subzero temperatures, vent pipes and hoods become covered with ice due to condensation. Obviously, the icing condition is extremely hazardous. Additionally, the pilot lights and burners of gas or oil fired furnaces, water heaters, etc., are sometimes extinguished due to high winds, or erratic winds, which create either a vacuum or down draft to extinguish the same.

Therefore, it is a principal object of this invention to provide a wind deflector for chimneys and the like.

A further object of this invention is to provide a wind deflector for chimneys and the like which prevents the pilot lights and burners associated therewith from being extinguished.

A further object of this invention is to provide a wind deflector for chimneys and the like which events dangerous icing of the vent pipes and hoods due to condensation in subzero temperatures.

A further object of this invention is to provide a wind deflector for chimneys and the like which eliminates the necessity of extending vent pipes to a higher elevation to correct problems created by wind or when the surrounding terrain creates a problem.

A further object of this invention is to provide a wind deflector for chimneys and the like which is easily mounted in a variety of environments.

A further object of this invention is to provide a wind deflector for chimneys and the like which is designed to enclose an existing ventilating pipe or hood.

A further object of this invention is to provide a wind deflector for chimneys and the like which may be manufactured in various sizes to fit stacks and hoods of different dimensions and which also may be constructed to fit the pitch of any roof without changing the principal or deflection design of the device.

A further object of this invention is to provide a wind deflector for chimneys and the like which may be installed in a vertical position for "through the roof" ventilation or may be installed in a horizontal position for "through the wall" or side ventilation.

A further object of this invention is to provide a wind deflector for chimneys and the like which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 2 is a sectional view as seen along lines 2—2 illustrating the device extending around the chimney or the like.

Figure 1:
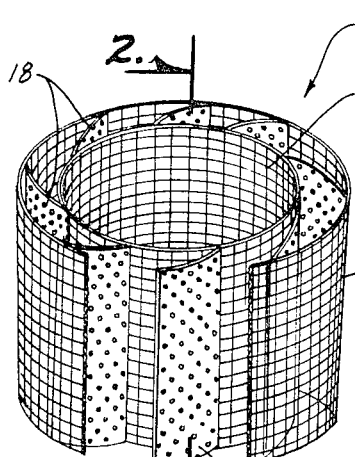
FIG. 1 is a partial perspective view of the device.
Figure 2:
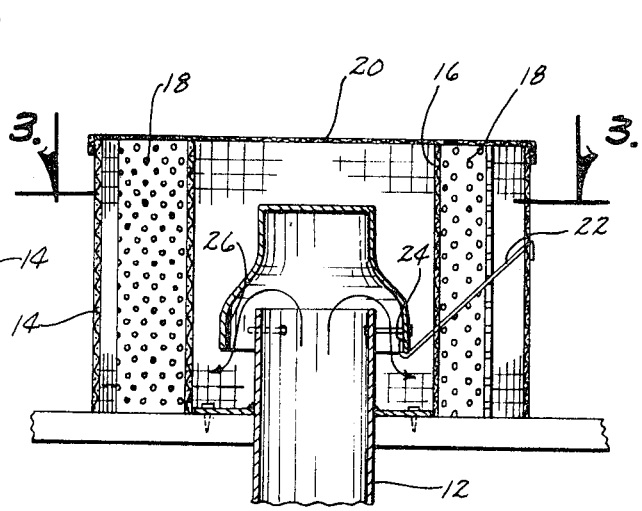

The deflector of this invention is generally designated by the reference numeral 10 and is adapted to be positioned around a chimney or the like which is generally referred to by the reference numeral 12 in FIG. 2. FIG. 2 illustrates that the chimney 12 is of the "through the roof" design but it should be understood that the deflector may be installed in a horizontal position for "through the wall" or side ventilation. The device may also be constructed to fit the pitch of any roof without changing the principal or deflection design of the device. Further, the size of the device may be varied to fit chimneys, stacks and hoods of different dimensions. Preferably, the deflector 10 has a diameter of two feet and is fifteen inches high.

Deflector 10 generally comprises an open-mesh cylindrical wire element 14 having an open-mesh cylindrical wire element 16 concentrically positioned in a spaced condition within the wire element 14. Preferably, element 14 is constructed of 14 gauge welded wire having 1 inch × 1 1/2 inch mesh openings. As previously stated, the diameter of element 14 is preferably 2 feet. Element 16 is preferably 14 inches in diameter and is constructed of a material identical to that of element 14.

Figure 3:
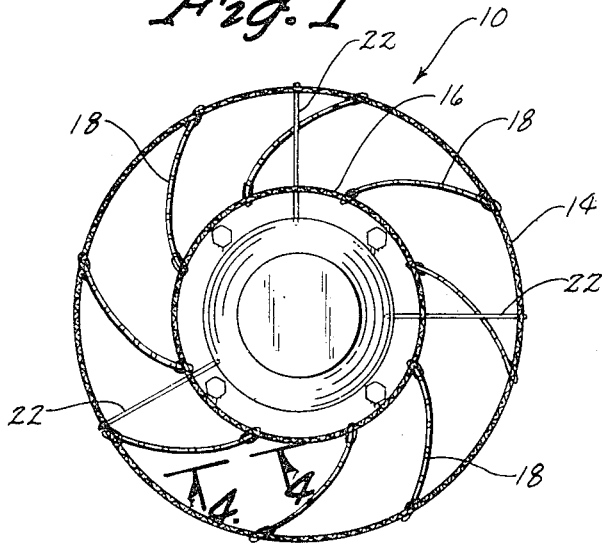
FIG. 3 is a top view of the device as seen along lines 3—3 of FIG. 2.
Figure 4:
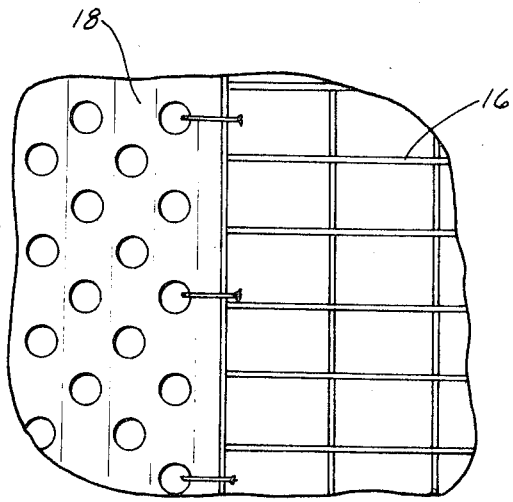
FIG. 4 is an enlarged sectional view as seen along lines 4—4 of FIG. 3.
Figure 5:
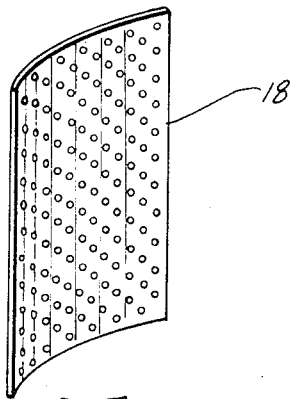
FIG. 5 is a perspective view of one of the deflectors which extend between the first and second wire elements.

A plurality of perforated arcuate baffle elements or deflectors 18 are symmetrically spaced in the space between the elements 14 and 16 and have their opposite ends secured thereto by any convenient means such as by wire or the like. The deflectors 18 are preferably constructed of galvanized sheet metal having three-sixteenth inch staggered holes provided therein. Preferably, each of the deflectors 18 are 8 inches wide and 15 inches long. Each of the deflectors 18 has a slight degree of curvature as illustrated in the drawings. The deflectors are arranged so as to point outward in a clockwise direction as illustrated in FIG. 3.

The numeral 20 refers to a welded wire cover positioned at the upper end of the device and which is fastened securely to the elements 16 and 18 by any convenient means such as wire or the like. The deflector 10 is positioned around the chimney or hood 12 as illustrated in FIG. 2 and is secured thereto by a plurality of wires 22. Each of the wires 22 has a prebent hook portion 24 at its inner end which is placed under the rim of the saddle portion 26 of the chimney 12. Each of the wires 22 extend upwardly from the saddle portion 26 at a 45° angle through the element 16, deflector 18 and element 14. The outer end of the wire 22 is bent downwardly so as to secure the same to the element 14. The wires 22 securely maintain the deflector 10 in position.

The deflector 10 is a device designed to enclose any existing ventilating pipe or hood such as found on gas or oil fired furnaces, water heaters, clothes dryers, plumbing vent stacks, etc. The deflector may be installed in a vertical position, horizontal position or on any pitched roof without departing from the deflection design of the device. In actual field trials and experiments, it has been found that the deflector prevents the extinguishing of the pilot lights and burners due to high winds or erratic winds, which would ordinarily create either a vacuum or downdraft in the chimney. The deflector prevents dangerous icing of the vent pipes and hoods due to condensation which would ordinarily be formed in subzero temperatures. The deflector eliminates the necessity of extending vent pipes to a higher elevation which is a practice used by some furnace repairmen in correcting problems created by wind, or when the surrounding terrain creates a problem. The element 14, deflectors 18 and element 16 deflect the wind around the chimney or the like so as to achieve the results discussed hereinbefore. The cover 20 serves to prevent leaves or the like from accumulating in the interior of the device.

Thus it can be seen that the deflector accomplishes at least all of its stated objectives.

I claim:

1. A wind deflector for chimneys and the like,
   a first open-mesh cylindrical wire element,
   a second open-mesh cylindrical wire element concentrically positioned in a spaced condition within said first wire element,
   and a plurality of baffle elements extending between said first and second wire elements, and having their opposite ends secured thereto, said baffle elements being substantially symmetrically spaced in the space between said first and second wire elements,
   each of said baffle elements comprising a perforated arcuate member,
   each of said arcuate baffle elements being secured at its inner end to said second wire element and extending outwardly therefrom towards said first wire element in a curved manner.

2. The deflector of claim 1 wherein said baffle elements extend outwardly from said second wire element in a clockwise fashion.

3. The deflector of claim 2 wherein said baffle elements are provided with a plurality of spaced apart perforations having a diameter of three-sixteenth inch.

4. A wind deflector for chimneys and the like,
a first open-mesh cylindrical wire element,
a second open-mesh cylindrical wire element concentrically positioned in a spaced condition within said first wire element,
a plurality of baffle elements extending between said first and second wire elements, and having their opposite ends secured thereto, said baffle elements being substantially symmetrically spaced in the space between said first and second wire elements,
and a plurality of fastening wires secured at their outer ends to said first wire element and extending inwardly through the deflector, said fastening wires adapted to be secured at their inner ends to said chimney or the like.

5. A wind deflector for chimneys and the like,
a first open mesh cylindrical wire element,
a second open-mesh cylindrical wire element concentrically positioned in a spaced condition within said first wire element,
and a plurality of baffle elements secured to and extending between said first and second wire elements, said baffle elements being substantially symmetrically spaced in the space between said first and second wire elements; said baffle elements having their inner ends secured to said second wire element and secured at their outer ends to said first wire elements,
said baffle elements having a height substantially equal to the height of said wire elements.

6. The deflector of claim 5 wherein each of said baffle elements comprises a perforated arcuate member extending from said second wire element to said first wire element in a curved manner.

7. The deflector of claim 5 wherein a flat, open-mesh wire element extends over said first and second wire elements and is secured thereto.

8. The deflector of claim 5 wherein said first and second wire elements have mesh openings of 1½ inch × 1 inch.

* * * * *